US010981677B1

(12) United States Patent
Judd et al.

(10) Patent No.: US 10,981,677 B1
(45) Date of Patent: Apr. 20, 2021

(54) SPACE VEHICLE WITH CUSTOMIZABLE PAYLOAD AND DOCKING STATION

(71) Applicant: Triad National Security, LLC, Los Alamos, NM (US)

(72) Inventors: Stephen Judd, Los Alamos, NM (US); Nicholas Dallmann, Los Alamos, NM (US); Kevin McCabe, Santa Fe, NM (US); Daniel Seitz, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 514 days.

(21) Appl. No.: 15/872,630

(22) Filed: Jan. 16, 2018

Related U.S. Application Data

(63) Continuation of application No. 14/746,046, filed on Jun. 22, 2015, now Pat. No. 9,878,805.

(60) Provisional application No. 62/016,566, filed on Jun. 24, 2014.

(51) Int. Cl.
| | | |
|---|---|---|
| *B64G 1/10* | (2006.01) | |
| *B64G 1/22* | (2006.01) | |
| *B64G 1/44* | (2006.01) | |
| *B64G 1/42* | (2006.01) | |
| *B64G 1/64* | (2006.01) | |

(52) U.S. Cl.
CPC ............... *B64G 1/10* (2013.01); *B64G 1/222* (2013.01); *B64G 1/428* (2013.01); *B64G 1/44* (2013.01); *B64G 1/641* (2013.01); *B64G 2001/1092* (2013.01)

(58) Field of Classification Search
CPC .......... B64G 1/10; B64G 1/222; B64G 1/428; B64G 1/44; B64G 1/641; B64G 1/646
See application file for complete search history.

(56) References Cited

U.S. PATENT DOCUMENTS

| 3,913,109 A | 10/1975 | Owen |
| 4,475,111 A | 10/1984 | Gittinger et al. |
| 4,508,404 A * | 4/1985 | Frawley ............... H01R 13/629 244/135 A |
| 4,780,727 A | 10/1988 | Seal et al. |
| (Continued) | | |

OTHER PUBLICATIONS

ESTCube-1 Wikipedia Page, https://en.wikipedia.org/wiki/ESTCube-1 (last accessed Apr. 24, 2014).

(Continued)

*Primary Examiner* — Justin M Benedik
(74) *Attorney, Agent, or Firm* — LeonardPatel P.C.; Michael Aristo Leonard, II; Sheetal Suresh Patel

(57) ABSTRACT

A "black box" space vehicle solution may allow a payload developer to define the mission space and provide mission hardware within a predetermined volume and with predetermined connectivity. Components such as the power module, radios and boards, attitude determination and control system (ADCS), command and data handling (C&DH), etc. may all be provided as part of a "stock" (i.e., core) space vehicle. The payload provided by the payload developer may be plugged into the space vehicle payload section, tested, and launched without custom development of core space vehicle components by the payload developer. A docking station may facilitate convenient development and testing of the space vehicle while reducing handling thereof.

20 Claims, 17 Drawing Sheets

(56) References Cited

U.S. PATENT DOCUMENTS

| | | | | |
|---|---|---|---|---|
| 5,040,748 | A * | 8/1991 | Torre | B64G 1/641 |
| | | | | 244/137.1 |
| 5,152,482 | A * | 10/1992 | Perkins | B64G 1/22 |
| | | | | 244/159.4 |
| 5,874,924 | A * | 2/1999 | Csongor | H01Q 1/288 |
| | | | | 343/789 |
| 5,986,619 | A * | 11/1999 | Grybos | H01Q 1/288 |
| | | | | 343/853 |
| 7,609,226 | B1 | 10/2009 | MacGahan et al. | |
| 7,817,101 | B2 | 10/2010 | Cowles | |
| 8,730,124 | B2 * | 5/2014 | Behrens | B64G 1/222 |
| | | | | 343/895 |
| 8,970,447 | B2 * | 3/2015 | Ochoa | H01Q 1/288 |
| | | | | 343/880 |
| 9,067,695 | B1 * | 6/2015 | Suh | B64G 1/443 |
| 9,853,353 | B2 | 12/2017 | Judd et al. | |
| 10,250,336 | B1 | 4/2019 | Palmer | |
| 2006/0073723 | A1 * | 4/2006 | Cowgill | H01R 13/6315 |
| | | | | 439/247 |
| 2007/0125910 | A1 | 6/2007 | Cepollina et al. | |
| 2010/0037932 | A1 * | 2/2010 | Erez | H01L 31/188 |
| | | | | 136/244 |
| 2010/0319956 | A1 * | 12/2010 | Ballard | B60R 16/0207 |
| | | | | 174/105 R |
| 2012/0160294 | A1 * | 6/2012 | Phu | H01L 31/188 |
| | | | | 136/244 |
| 2014/0253410 | A1 | 9/2014 | Dinallo et al. | |
| 2016/0264266 | A1 | 9/2016 | Stone | |

OTHER PUBLICATIONS

Justin M. Benedik, "Final Office Action", dated Sep. 26, 2017, U.S. Appl. No. 14/746,046.
Justin M. Benedik, "Non-Final Office Action", dated May 18, 2017 for U.S. Appl. No. 14/746,046.
Justin M. Benedik, "Notice of Allowance", dated Nov. 30, 2017, U.S. Appl. No. 14/746,046.
Non-final Office Action issued in U.S. Appl. No. 14/745,763 dated Feb. 10, 2017.
Restriction Requirement issued in U.S. Appl. No. 14/745,763 dated Oct. 4, 2016.
Restriction Requirement issued in U.S. Appl. No. 14/746,046 dated Feb. 14, 2017.
Space Micro MSS-01,02 Medium Sun Sensors Brochure, http://www.spacemicro.com/assets/datasheets/guidance-and-nav/MSS.pdf (May 2, 2014).
Trinh Vo Dinh, "Final Office Action", dated Jul. 10, 2017, U.S. Appl. No. 14/745,763.
Trinh Vo Dinh, "Notice of Allowance", dated Oct. 12, 2017, U.S. Appl. No. 14/745,763.
Yazan A Soofi, "Non-Final Office Action", dated Feb. 5, 2020, U.S. Appl. No. 15/940,816.
The JSON Data Interchange Syntax, http://www.ecma-international.org/publications/files/ECMA-ST/ECMA-404.pdf (last accessed Mar. 29, 2018).
Yazan A Soofi, "Notice of Allowance", dated Apr. 20, 2020, U.S. Appl. No. 15/940,816.
Justin M Benedik, "Non-Final Office Action", dated Nov. 13, 2020, U.S. Appl. No. 15/940,714.

* cited by examiner

100

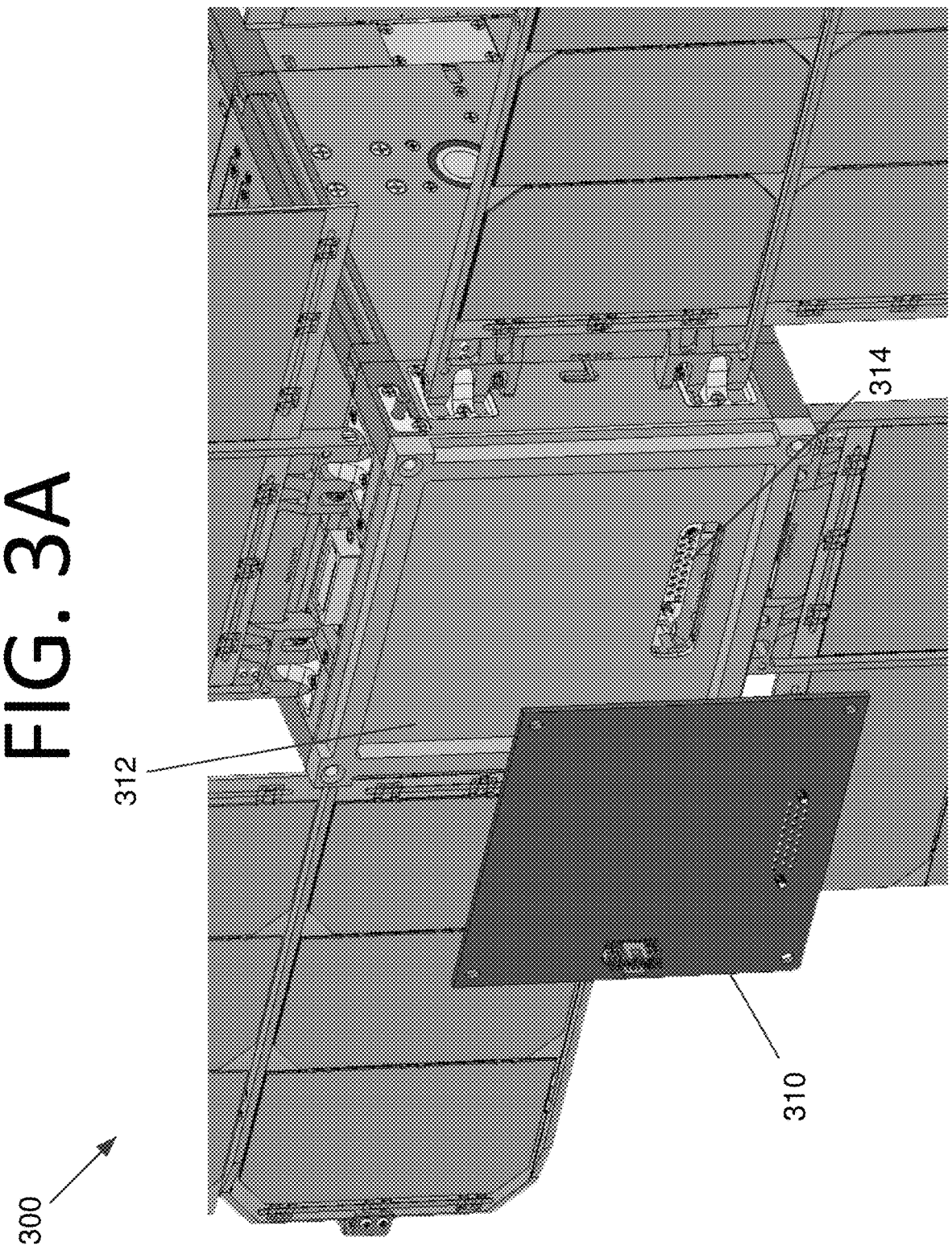

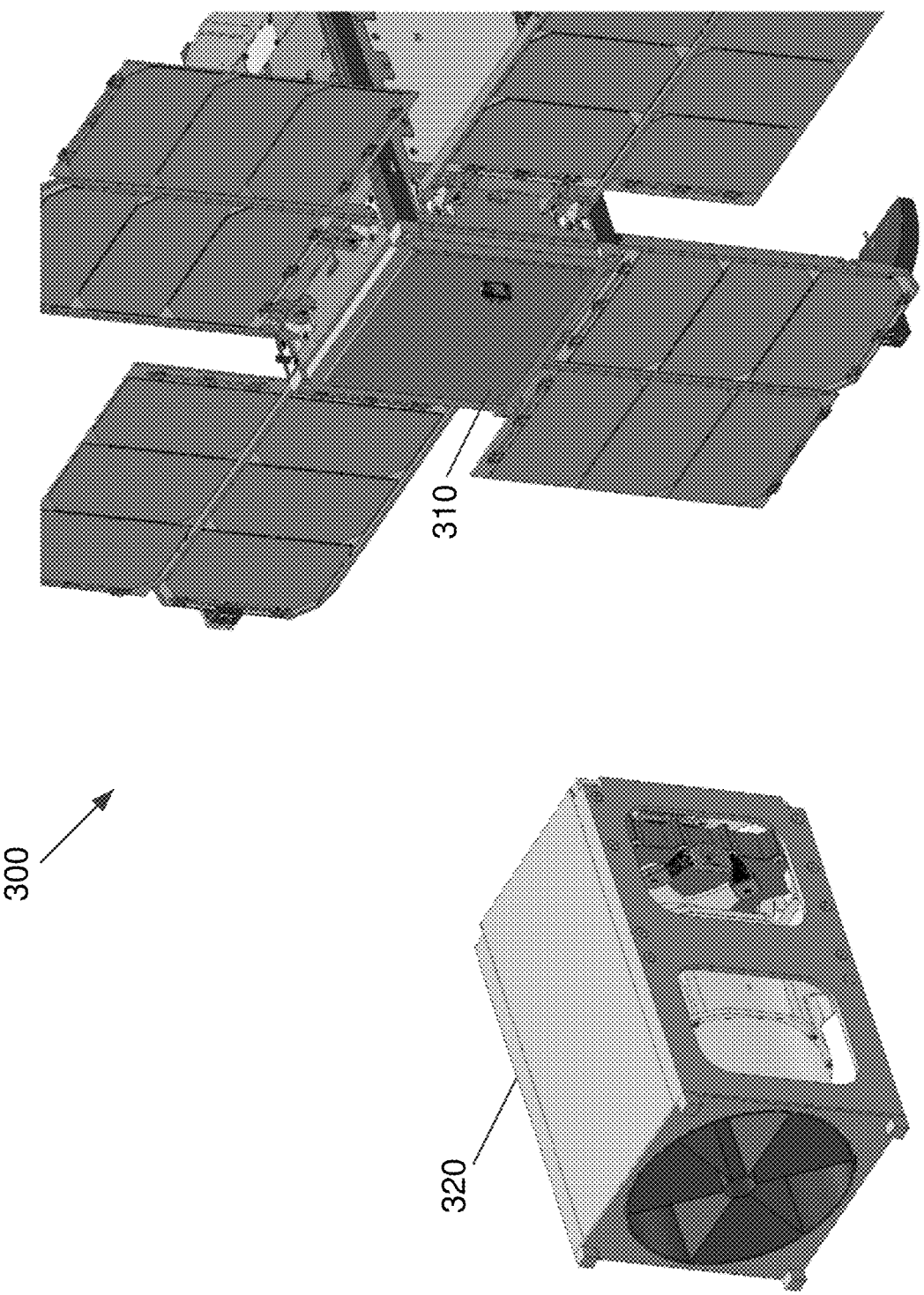

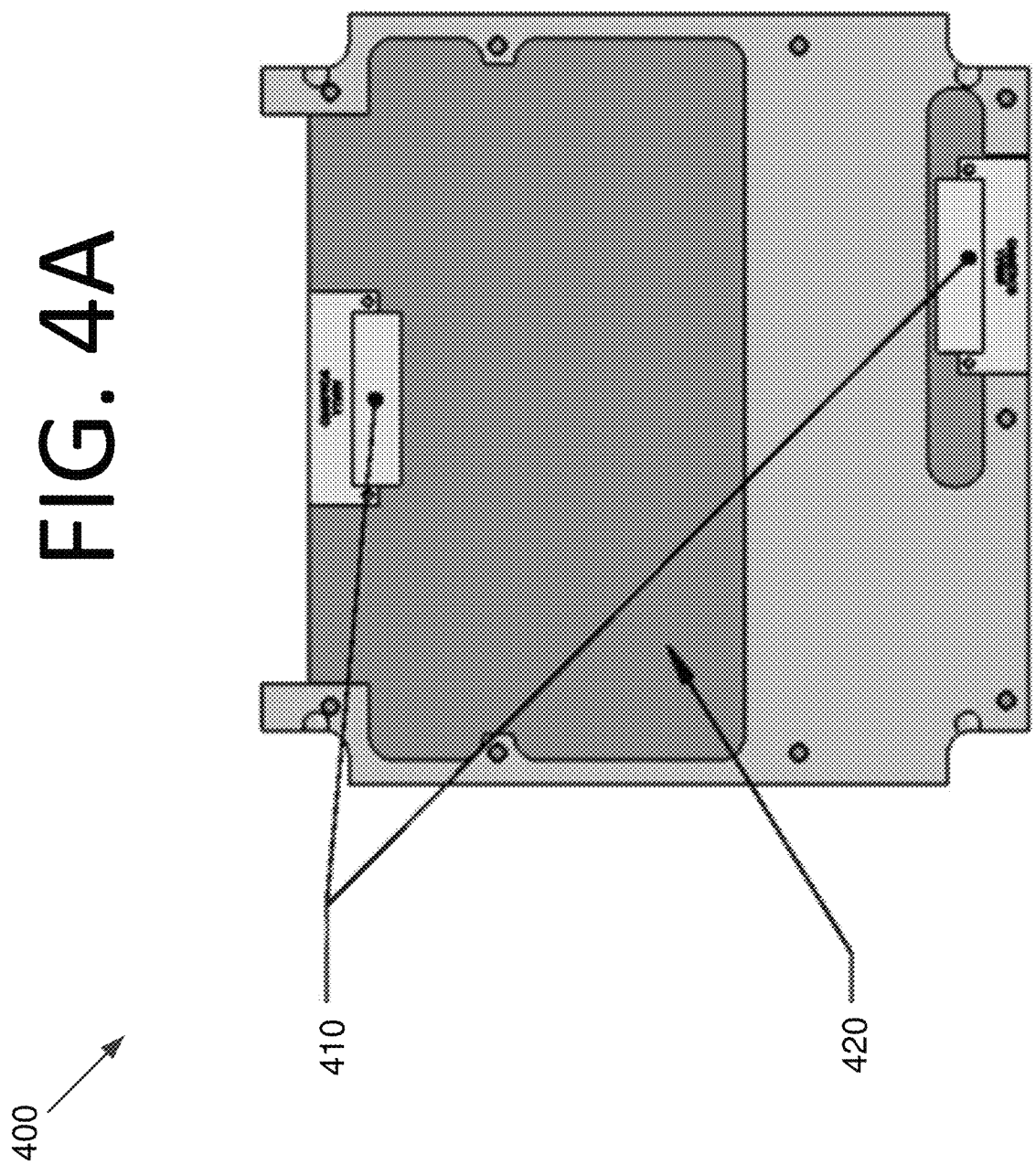

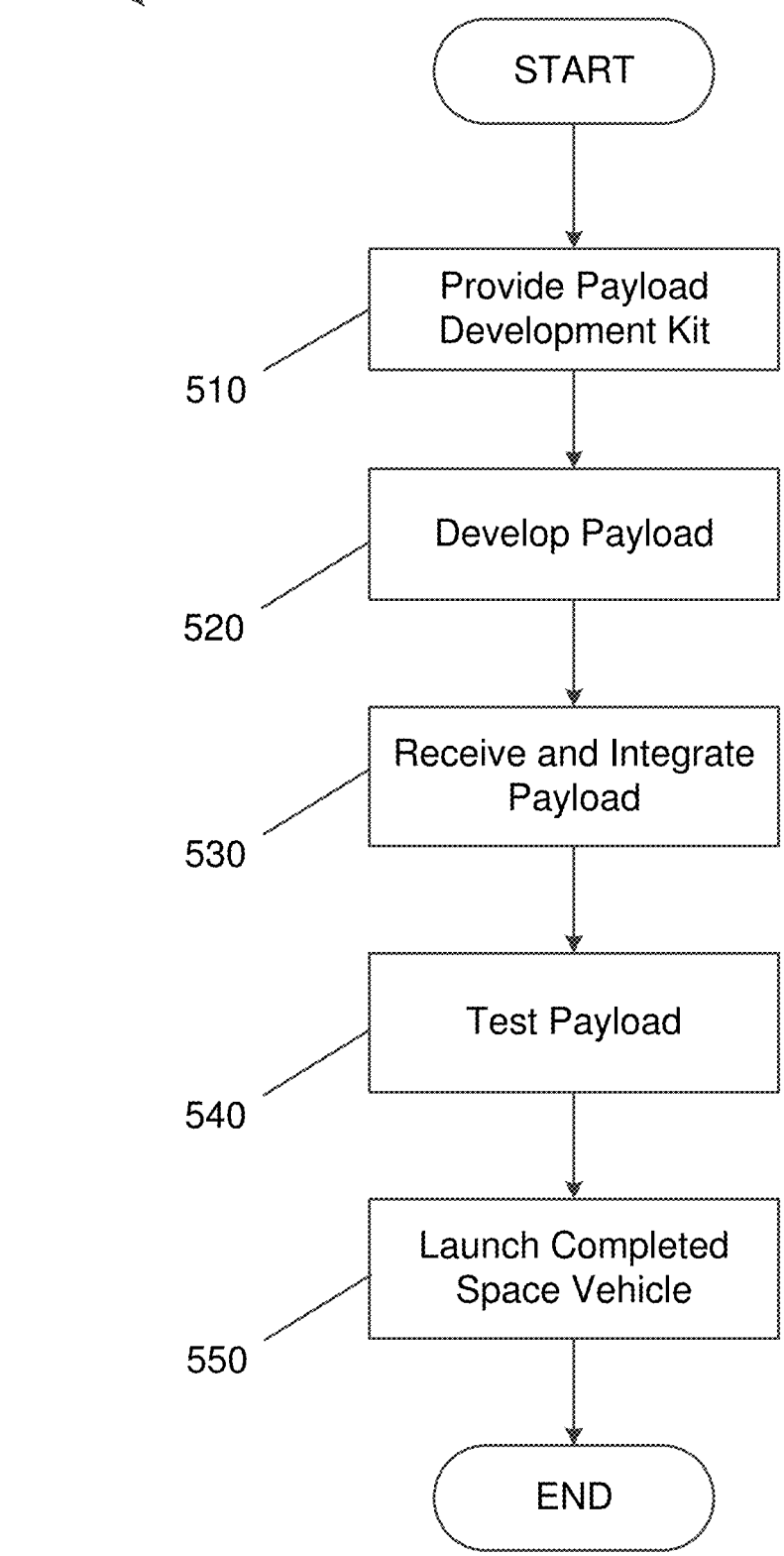

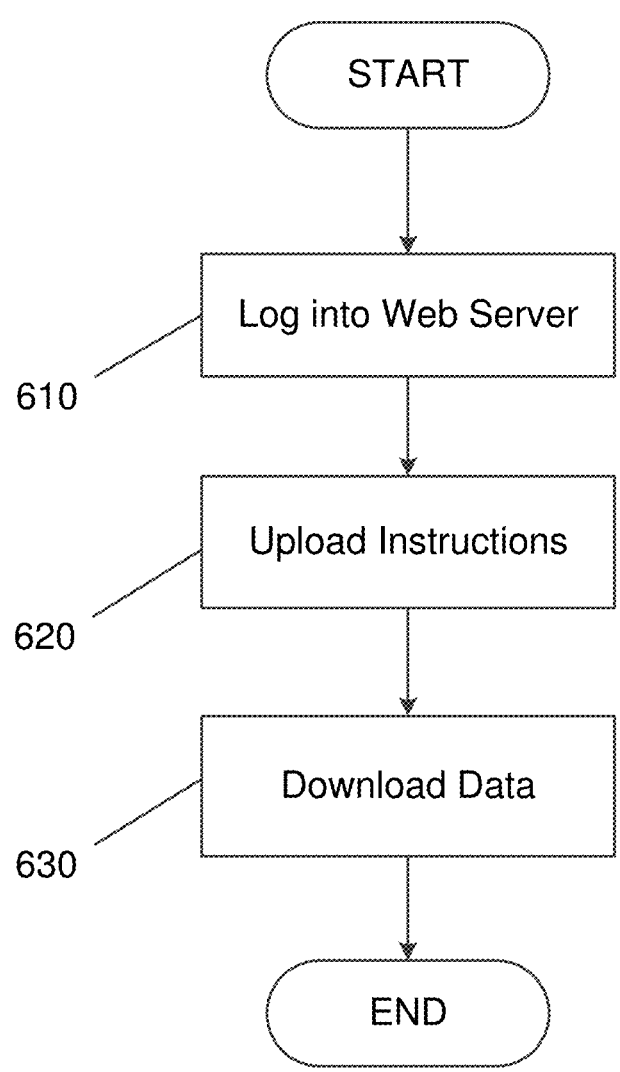

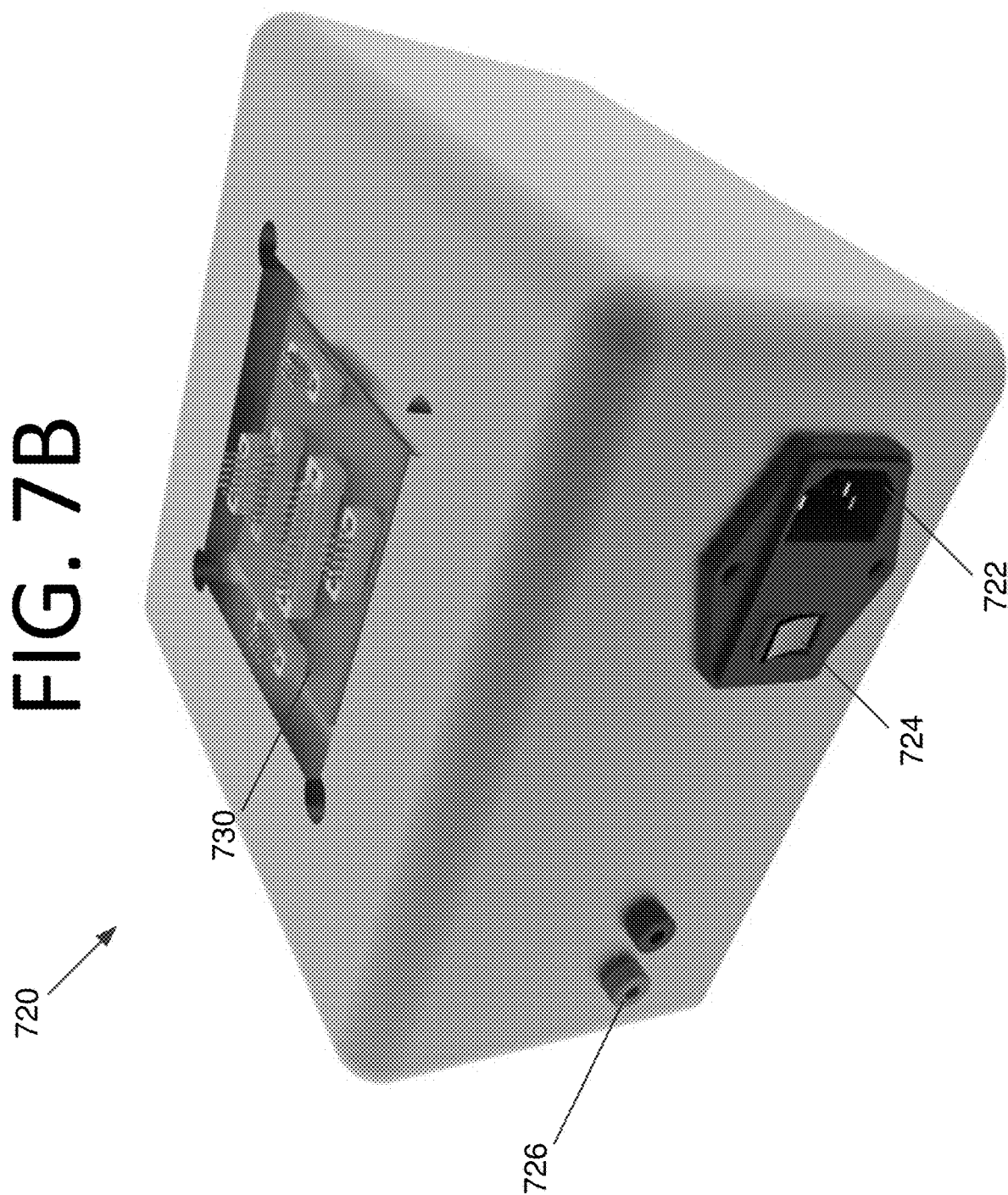

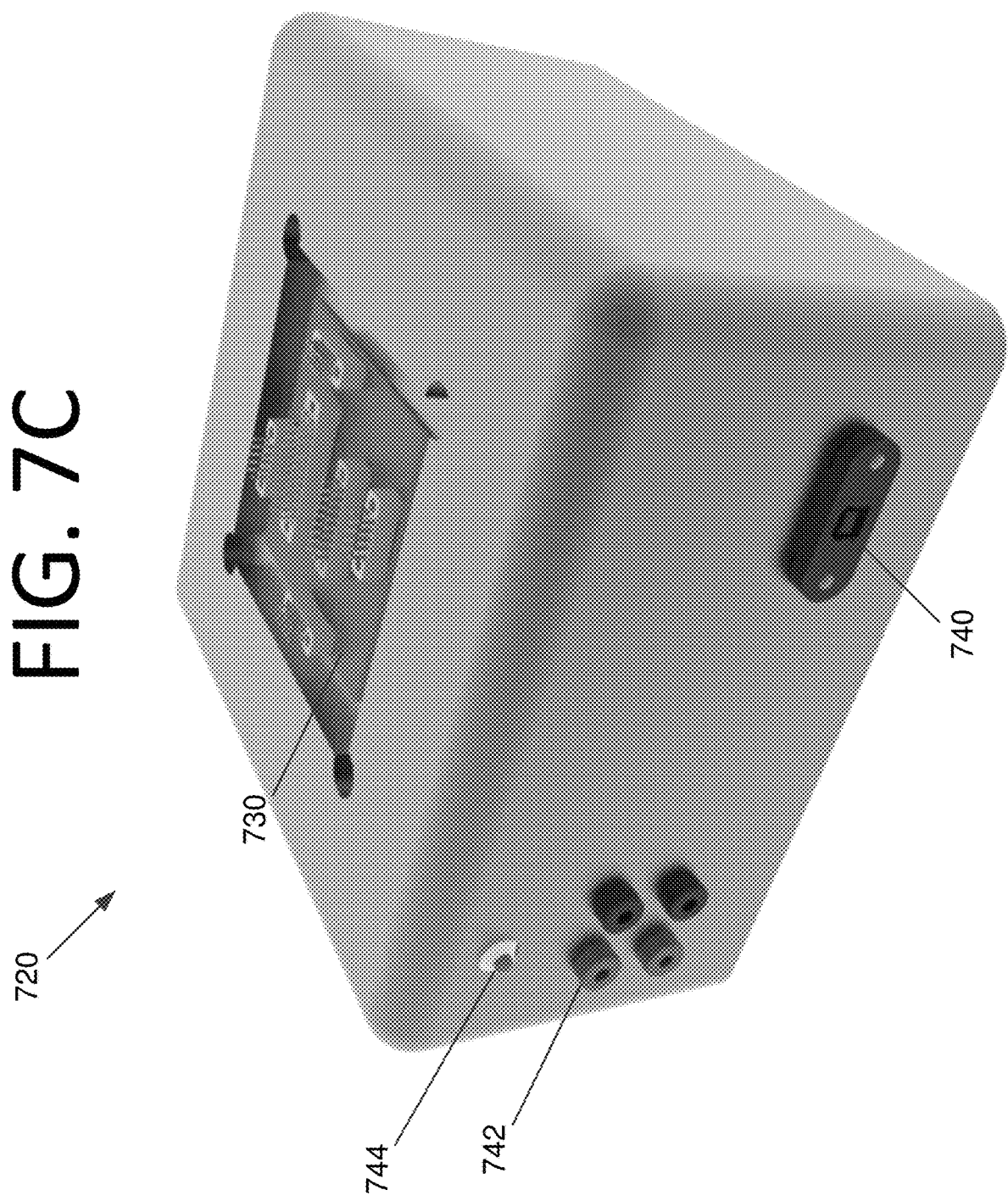

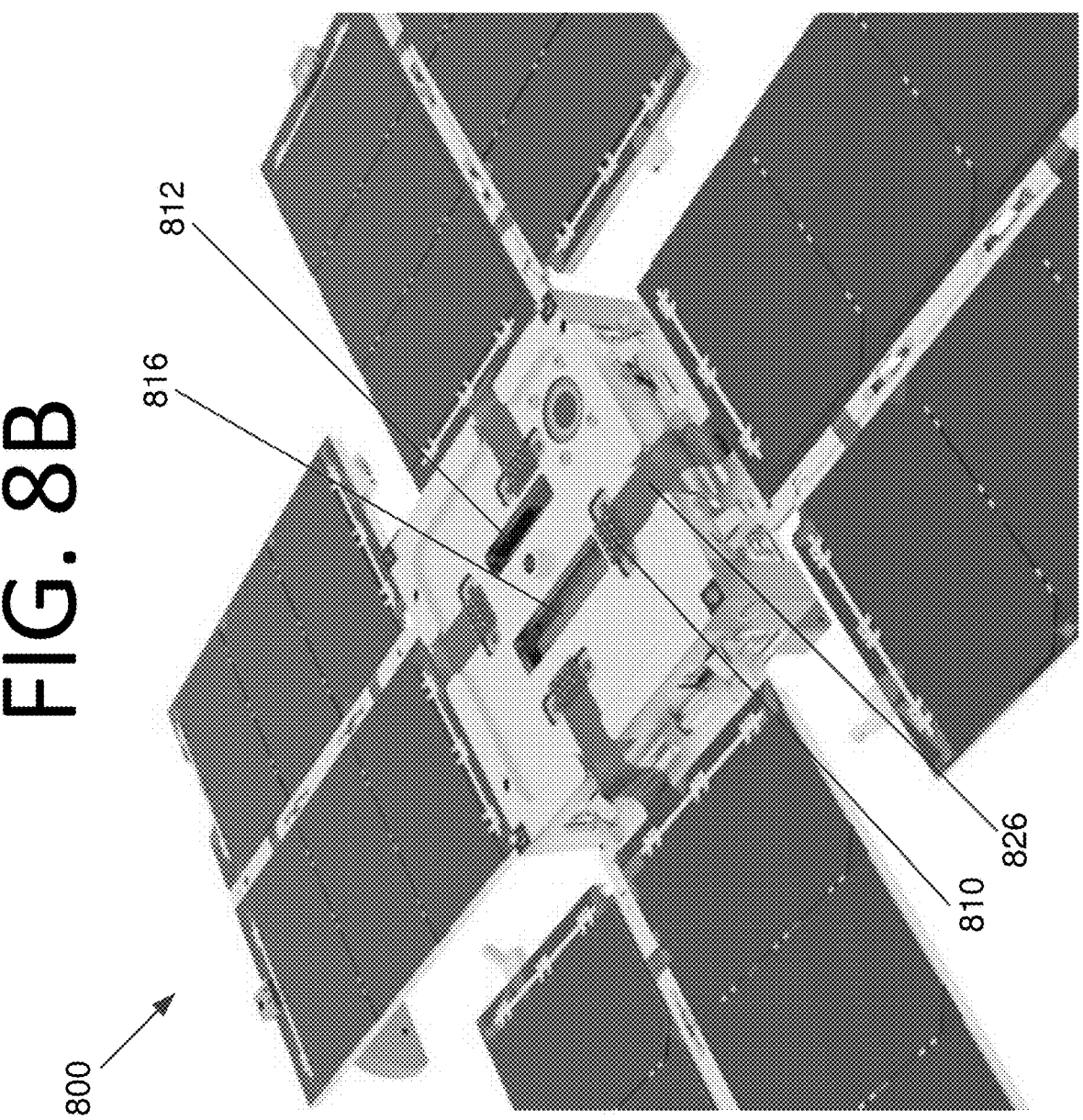

SPACE VEHICLE WITH CUSTOMIZABLE PAYLOAD AND DOCKING STATION

CROSS REFERENCE TO RELATED APPLICATION

This application is a continuation of U.S. nonprovisional patent application Ser. No. 14/746,046 filed Jun. 22, 2015, which claims the benefit of U.S. provisional patent application No. 62/016,566 filed Jun. 24, 2014. The subject matter of these earlier filed applications is hereby incorporated by reference in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD

The present invention generally relates to space vehicles, and more particularly, to a space vehicle with a payload section and interface that allow the user to treat the remainder of the space vehicle as a "black box" where the payload developer does not require specific knowledge of other space vehicle components and a docking station.

BACKGROUND

Traditional multi-mission satellites consist of a satellite bus that provides basic satellite functionality, including power, communications, and attitude control, with a provision to host one or more payloads and the ability to command payloads from the ground. Traditional satellite busses cost tens to hundreds of millions of dollars and have detailed and complex payload and command interfaces, which substantially increase costs and development time. Moreover, the payload sections are typically volume, shape, and power constrained, forcing the payload designer to design around the satellite bus, which can result in undesirable performance, higher costs, and increased risks.

In recent years, cubesats have emerged as an alternative to traditional space solutions. Cubesats are relatively simple and can be developed with a more rapid turnaround. For space missions with smaller power and equipment capability requirements, cubesats may offer the potential for an out-of-the-box solution where the same satellite can be used for different missions based on mission-specific software. Cubesats can be produced and purchased for a lower cost than conventional satellite systems, and have a higher availability for launch since they can be deployed by smaller, more widely available, less costly secondary payload launch options.

However, conventional cubesats present a number of major design challenges for many missions, particularly for a multi-mission satellite bus. For instance, conventional cubesats have very limited power and volume. Also, a design team still has to account for all normal effects of space operation (e.g., radiation, thermal management, launch envelope, etc.) without the benefit of traditional space components, and with little design margin in order to create a functional space vehicle. As a result, most conventional cubesats have been plagued with issues of poor reliability, short lifetime, and poor performance. In fact, many conventional cubesats fail to even turn on and make initial contact.

Extending cubesats to provide a multi-mission bus capability has proven especially difficult. Previous attempts at producing multi-mission cubesats have yielded satellites with relatively high costs, very little power and volume left for the payload section, and payload interfaces that are complex and/or limited in functionality. This leads to higher costs, longer development times, and poor reliability. Extending these designs to larger form factors is thus highly problematic. Accordingly, an improved space vehicle that is reliable and supports a variety of payloads may be beneficial. Also, a convenient mechanism for space vehicle development, testing, and battery charging that reduces space vehicle handling may be beneficial.

SUMMARY

Certain embodiments of the present invention may provide solutions to the problems and needs in the art that have not yet been fully identified, appreciated, or solved by conventional space vehicles. For example, some embodiments pertain to a "black box" space vehicle solution including an empty payload section and interface where a payload developer can provide mission hardware and logic. This payload section may have a predetermined volume and predetermined connectivity. The payload provided by the payload developer can then be plugged into the space vehicle payload section, tested, and launched without custom development of other space vehicle components by the payload developer. Some embodiments include a docking station that facilitates convenient development, testing, and battery charging of the space vehicle while reducing handling thereof.

In an embodiment, an apparatus includes a payload section and an electrical interface board configured to interface with a payload of the payload section. The electrical interface board includes a power and communications interface to a main bus of the apparatus.

In another embodiment, a space vehicle includes a payload and a payload section configured to house the payload. The space vehicle also includes an electrical interface board configured to interface with the payload and a digital interface board configured to provide dedicated digital processing for the payload. The electrical interface board includes a power and communications interface to a main bus of the space vehicle. The digital interface board communicates with the payload section via the payload electrical interface board and inherits a software stack of the space vehicle.

In yet another embodiment, a payload development kit includes a mechanical portion including an empty shell and an electrical portion including a payload module circuit board that interfaces a payload to a remainder of a space vehicle. The payload development kit also includes a fit-check enclosure that ensures that a final payload will interface mechanically to the space vehicle and fit in a dispenser and a space vehicle simulator that ensures that the payload section will interface electrically and software-wise to the space vehicle.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 3A is an exploded perspective view illustrating a space vehicle with a detached payload electrical interface board, according to an embodiment of the present invention.

FIG. 3B is a perspective view illustrating the space vehicle with the payload electrical interface board attached and a detached payload section, according to an embodiment of the present invention.

FIG. 4A is a top view illustrating a payload digital interface board, according to an embodiment of the present invention.

FIG. 5 is a flowchart illustrating a process for developing and implementing a black box payload solution for a space vehicle, according to an embodiment of the present invention.

FIG. 6 is a flowchart illustrating a process for operating a space vehicle, according to an embodiment of the present invention.

FIG. 7B is a perspective view of a solid model rendering illustrating a top and rear of the docking station, according to an embodiment of the present invention.

FIG. 7C is a perspective view of a solid model rendering illustrating a top and front of the docking station, according to an embodiment of the present invention.

FIG. 8B is a closeup bottom perspective view of a solid model rendering illustrating the power section, according to an embodiment of the present invention.

DETAILED DESCRIPTION OF THE EMBODIMENTS

Some embodiments of the present invention pertain to a "black box" space vehicle solution that lets a payload developer define the mission space and provide mission hardware within a predetermined volume and with predetermined connectivity. In other words, components such as the power module, radios and boards, attitude determination and control system (ADCS), command and data handling (C&DH), etc. are all provided as part of a "stock" space vehicle. The payload provided by the payload developer can then be plugged into the space vehicle payload interface, tested, and launched without custom development of core space vehicle components by the payload developer in some embodiments. This decreases cost and development time. The payload, in essence, becomes an "application" that the space vehicle runs and enables the space vehicle's mission.

Figure 1:
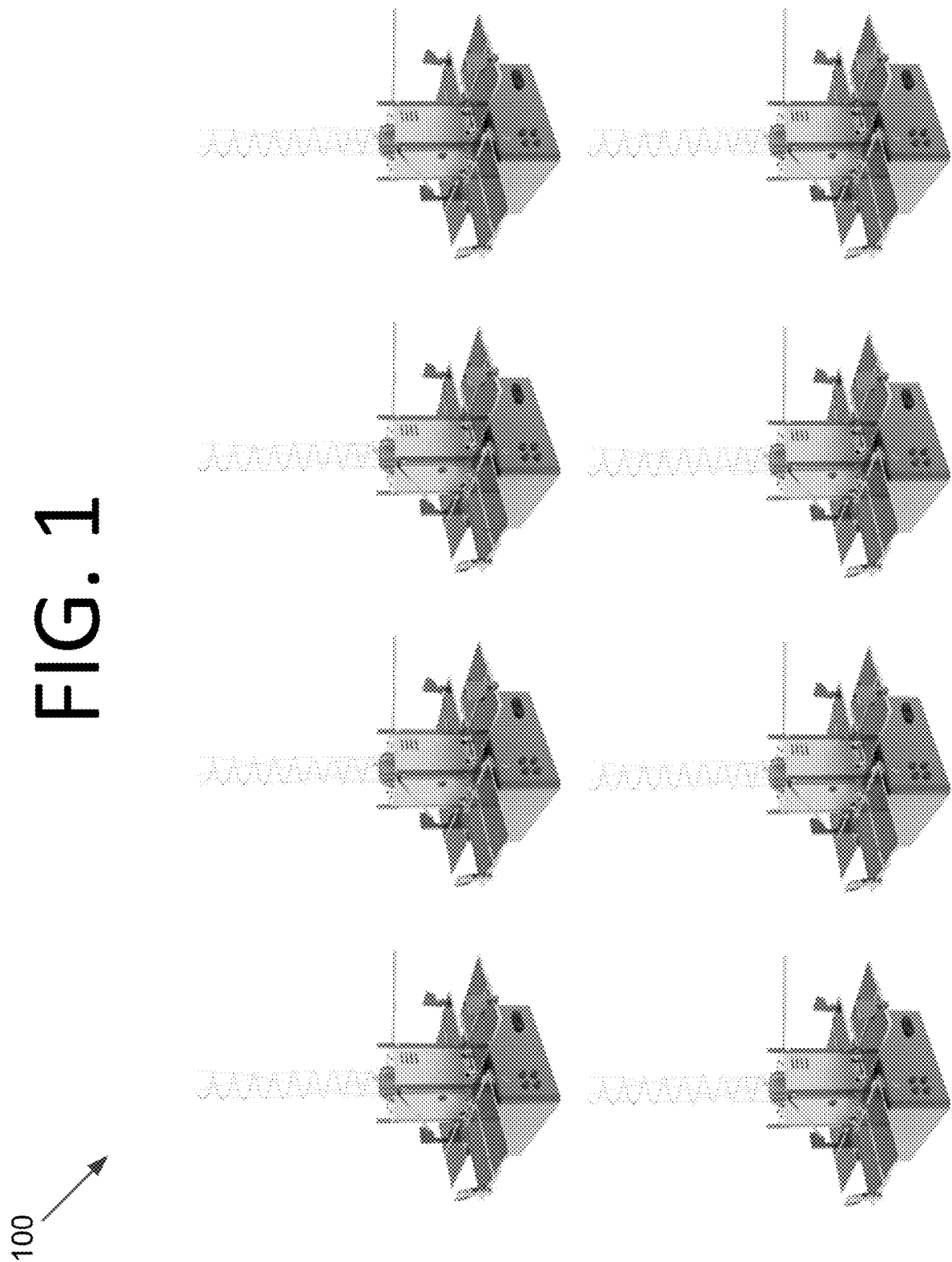
FIG. 1 illustrates solid model renderings of eight prototype cubesats with a common architecture, according to an embodiment of the present invention.

FIG. 1 illustrates solid model renderings 100 of eight prototype cubesats, according to an embodiment of the present invention. As can be seen in FIG. 1, these 1.5 U cubesats share a common architecture. Twelve prototype cubesats have been launched as of June of 2014 with a 100% success rate, demonstrating far superior reliability to conventional cubesats. These prototype cubesats include everything needed for typical core satellite operations, including power, a 3-axis ADCS, C&DH, secure encrypted communications, a software-defined radio, and deployed solar panels and antennas. However, in other embodiments, more or less hardware and/or functionality may be included. These cubesats do not have a payload section, but were used to demonstrate proof of concept. The prototype cubesats are fully reprogrammable on-orbit, are designed to last 3+ years at low Earth orbit (LEO), and the replication cost for the satellites is less than $150,000, which is considerably lower than space vehicles with similar functionality and capabilities. The result is a low cost, high performance space solution.

The space vehicles of some embodiments may be designed to be flexible, and may be applicable to a broad variety of missions. Some of the advantages of such embodiments include a relatively low hardware and integration cost and straightforward integration. Instead of long manuals and complex payload design procedures, some embodiments may only need a short manual (e.g., three pages) with some simple rules and guidelines. Some embodiments also have high reliability and mission assurance. In other words, payload developers can be confident that they will be able to talk to the space vehicle, turn on the payload, and download data.

Also International Traffic in Arms Regulations (ITAR) and operations security (OPSEC) issues may arise if a space vehicle bus were sent to the payload developer. By providing the payload developer with a satellite hardware and software simulator and relatively simple instructions for how to interface the payload with the rest of the space vehicle components, the payload developer can implement the payload without having physical access to the space vehicle. The space vehicle designer may then receive the payload from the payload developer, integrate the payload with the satellite, and test the payload and overall system, creating a fully functional "black box" space vehicle. The space vehicle may then be launched into Earth orbit or beyond and deployed.

Whereas traditional multi-mission bus designs provide a payload section inside the main bus, some embodiments are unusual in that the payload section is attached to the "bottom" end of the space vehicle (e.g., a satellite). However, the payload may be attached to other locations or housed internally within the space vehicle in other embodiments. In such embodiments, the satellite provides a payload hosting capability, as opposed to a payload section. As-is, with no payload, the satellite may be fully functional and mission capable, but capable of hosting payloads without changing the satellite design. This approach may provide a clear and unobstructed area for the payload designer, allow the bus and payload sections to be developed independently, enable the use of a high gain antenna on a space vehicle for much higher data rates for ground communications, and enable the use of a common satellite design for hosted and non-hosted missions.

Multi-Mission Bus

Some embodiments provide an empty payload section to the space vehicle. For instance, a 1.5 U space vehicle may be extended to a 3 U space vehicle by inclusion of a 1.5 U payload section. However, any desired space vehicle size and payload size may be used as a matter of design choice, and this multi-mission bus concept may be extended to space vehicles of any size. In some embodiments, the approach and technologies used for smaller cubesat embodiments, for example, may be used and scaled to produce larger satellite platforms at considerably lower cost than the state of the art.

Figure 2A:
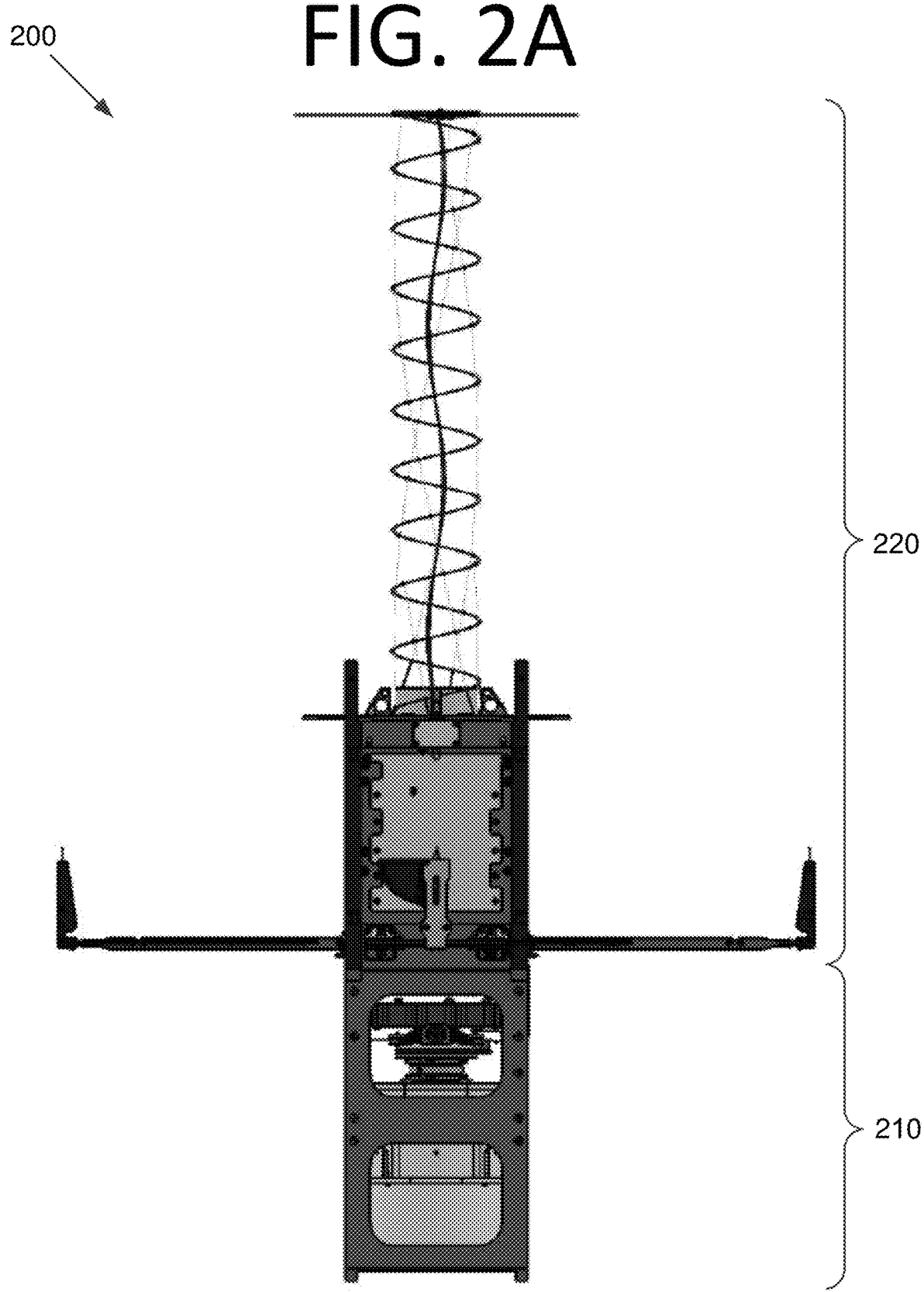
FIG. 2A is a side view illustrating a space vehicle, according to an embodiment of the present invention.
Figure 2B:
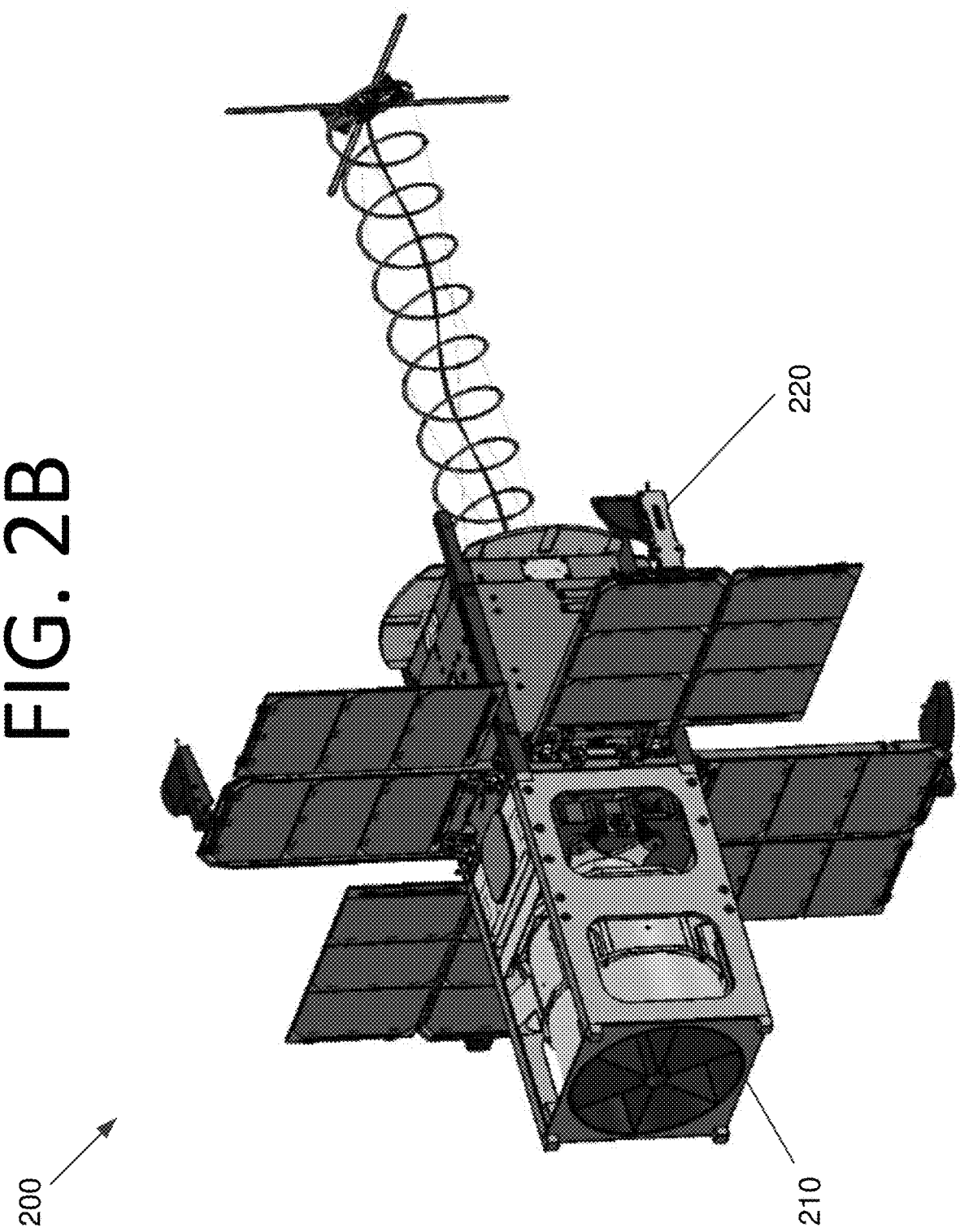
FIG. 2B is a perspective view illustrating the space vehicle, according to an embodiment of the present invention.

FIGS. 2A and 2B illustrate a space vehicle 200, according to an embodiment of the present invention. Space vehicle 200 includes a payload section 210 that houses a payload and a core section 220 that provides core space vehicle functionality, such as communications, ADCS, etc. An electrical and mechanical interface (not visible in FIGS. 2A and 2B) may provide an interface between payload 210 and core section 220.

In this embodiment, the solar panels are multi-fold, and more specifically, bi-fold, solar panels. The bi-fold panel configuration doubles the solar cell area of the solar panels, doubling the amount of power available to the space vehicle. However, any number of "folds" and any solar panel shape may be used without deviating from the scope of the invention.

In this embodiment, space vehicle 200 has a 3 U bus derived from a 1.5 U space vehicle. In other words, payload section 210 and core section 220 are each 1.5 U. However, in certain embodiments, space vehicle 200 may be lengthened to provide a larger internal payload section. The payload section may be any desired size as a matter of design choice. In certain embodiments, solar panels may also be lengthened to take advantage of the additional height, providing more power availability. The solar panels may also be multi-fold solar panels that fold two or more times in order to provide a larger surface area for collecting solar energy. A payload electrical interface board (not visible) may provide electrical and communications interfaces to payload section 210. A payload digital interface board (not visible) may provide dedicated digital processing for the payload and also provide an interface with the main bus. The payload digital interface board may plug into a common backplane (not shown) used by the other space vehicle boards in some embodiments.

FIG. 3A is an exploded perspective view illustrating a space vehicle 300 with a detached payload electrical interface board (i.e., breakout board) 310, according to an embodiment of the present invention. A mechanical interface plate 312 covers up connectors (not shown) of a power section with the exception of a payload/interface connector 314 in this embodiment. FIG. 3B is a perspective view illustrating space vehicle 300 with payload electrical interface board 310 attached and a detached payload section 320, according to an embodiment of the present invention. Payload electrical interface board 310 may provide a common power and communications interface to payload section 320, including bi-directional serial communications, bi-directional parallel input/output (I/O) lines, interrupts, a reset line, and several common voltages. In some embodiments, payload electrical interface board 310 may be designed to be compatible with previous cubesat interface designs, allowing previously designed sensors to be used with minimal modification. In certain embodiments, payload electrical interface board 310 may be modified to provide a custom interface based on input from the payload designer.

FIG. 4A is a top view illustrating a payload digital interface board 400, according to an embodiment of the present invention. The payload may use payload digital interface board 400 for data acquisition and processing in lieu of developing a separate board in the payload section. Payload digital interface board 400 may provide dedicated processing for the payload while inheriting the full space vehicle software stack, including the file system, communications, networking, file transfer capabilities, the ability to be reprogrammed from the ground, etc. Payload digital interface board 400 may include a section 410 with various hardware components, such as a microprocessor, static random access memory (SRAM), flash storage, field programmable gate arrays (FPGAs), etc.

Figure 4B:
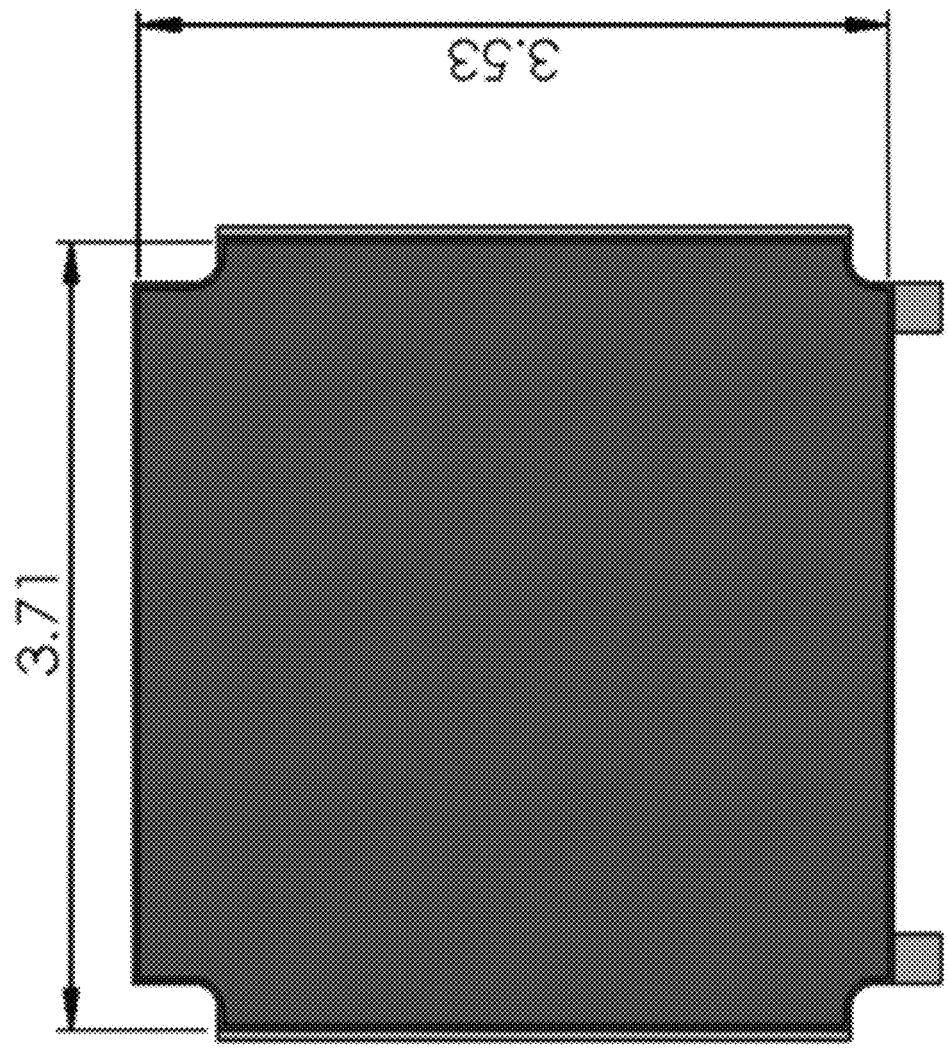
FIG. 4B is a bottom view illustrating the payload digital interface board, according to an embodiment of the present invention.
Figure 4C:
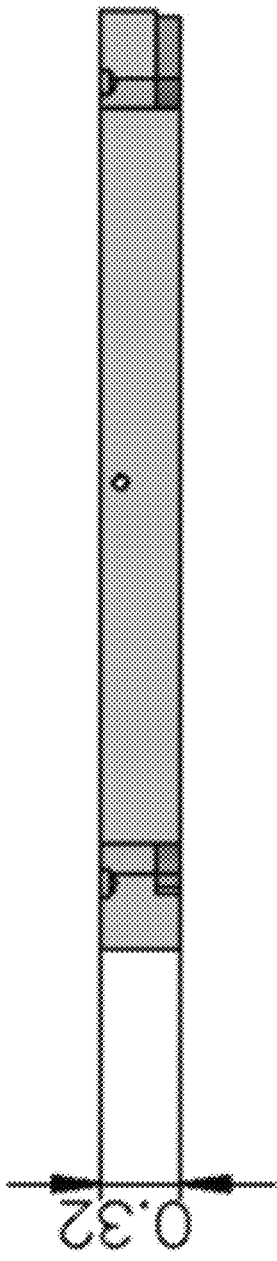
FIG. 4C is a side view illustrating the payload digital interface board, according to an embodiment of the present invention.

FIG. 4B is a bottom view illustrating payload digital interface board 400, according to an embodiment of the present invention. In this embodiment, payload digital interface board 400 is 3.71 inches wide and 3.53 inches tall. FIG. 4C is a side view illustrating payload digital interface board 400, according to an embodiment of the present invention. In this embodiment, payload interface board is 0.32 inches thick.

From a payload designer's perspective, the payload designer may use payload digital interface board 400 to retrieve data files from a payload containing its own electronics or interface to and control the payload directly. The relatively difficult tasks of designing a digital board, designing the main space vehicle interface, and moving data to the ground may already be taken care of in some embodiments. The payload designer may not need to know the details of the main space vehicle design and may have full flexibility to use the payload section as desired. Thus, from the space vehicle designer's perspective, the payload designer may not be able to destroy an otherwise functional and operational space vehicle, being restricted to the payload section. The space vehicle designer may build and control the space vehicle, providing much higher confidence that the space vehicle will work on orbit and protecting more sensitive design aspects.

Payload Integration

Some embodiments may simplify payload integration. For example, a payload suite may be provided to an outside entity (e.g., the payload developer). A mechanical portion (e.g., an empty aluminum shell to provide the payload designer with the payload size), an electrical portion (e.g., a payload module circuit board that interfaces the payload to the rest of the space vehicle), a fit-check enclosure to ensure that the final payload will interface mechanically to the main space vehicle and fit in a dispenser, and a space vehicle simulator to ensure that the payload section will interface electrically and software-wise to the main space vehicle may be provided to the payload developer.

The payload module may plug into a payload electrical interface board and be mechanically attached to the space vehicle. From a hardware perspective, the primary integration tasks for the payload developer in some embodiments may be determining placement within the payload module and interfacing the payload hardware to the payload electrical interface board. A crossbar approach may be used to route specific FPGA and microcontroller pins between the payload interface board and the payload as needed.

From a software perspective, the payload may inherit some or all of the main space vehicle software features without requiring a detailed knowledge of how the space vehicle works "under the hood." For example, the payload digital interface board may become reprogrammable from the ground, allowing the user or another software developer to develop and test software after launch. Moreover, the system may be designed to move files. In such embodiments, all the payload developer may need to do is store data in files, and the system will do the rest.

On-Orbit Operations

There may be potential problems with providing ground stations to users in some embodiments. One issue is the ITAR/OPSEC issue. The ground station may contain a radio and encryption keys that should be protected (or must be protected by U.S. law). Another issue is frequency allocation. More specifically, frequency allocation for one entity may not necessarily transfer to other entities.

However, some embodiments may be designed to operate automatically. The ground station may automatically contact space vehicles, monitor their state of health, and downloads files. Thus, using a ground station or a family of ground stations of the system designer or another authorized entity, a system may be created where files and state of health (SOH) are downloaded to a web server, for example. The user may be given a directory and a password and can log in remotely to retrieve downloaded files as desired and provide files for upload (commanding, etc.). An email interface may also be provided in addition to or in lieu of a web interface. However, any suitable interface and data retrieval mechanism may be used as a matter of design choice.

The model described above may not provide a real-time interface to a payload developer. A majority of applications do not require this functionality, just periodic transmission of data up to and down from the space vehicle. However, some embodiments are designed with a security model that supports the concept of a privileged user (e.g., an administrator that can modify the space vehicle) and a non-privileged user (e.g., a user that only performs more basic functions, such as data file transfer or payload commanding). Thus, there are multiple options available should a payload designer want additional flexibility, such as real-time control. Nonetheless, in some embodiments, the space vehicle developer may control the initial space vehicle checkout and payload turn-on, maintain the ground station(s), provide a service to diagnose and fix space vehicle issues, and provide a password-protected web login or equivalent functionality for users to communicate with their payload via simple file transfers.

FIG. 5 is a flowchart 500 illustrating a process for developing and implementing a black box payload solution for a space vehicle, according to an embodiment of the present invention. The process begins with providing a payload development kit to a payload developer at 510. The payload development kit may include a mechanical portion, an electrical portion, a fit-check enclosure, and a space vehicle simulator. The payload developer then develops the desired payload using the payload development kit at 520 and sends the developed payload to the space vehicle developer.

The space vehicle developer receives the payload and integrates the payload into the space vehicle payload section at 530. The space vehicle developer then tests the payload at 540 to ensure that the payload works properly with the space vehicle. Once testing and debugging is complete, the completed space vehicle is launched and deployed.

FIG. 6 is a flowchart 600 illustrating a process for operating a space vehicle, according to an embodiment of the present invention. The process begins with the payload developer logging into a web server remotely at 610. If the payload developer has code changes to upload to the payload, code files are uploaded to the web server at 620 for uplink to the space vehicle by the space vehicle developer using a ground station. The payload developer then downloads data from the space vehicle for its mission at 630.

Docking Station

Per the above, during space vehicle development and testing, it is desirable to be able to test the space vehicle when fully assembled while reducing or minimizing handling of the space vehicle, which may cause inadvertent damage to various components thereof. A docking station may provide power and communications to the space vehicle, a safe location for space vehicle storage, battery charging, and development, and a fieldable capability for space vehicle testing. The docking station of some embodiments can also be used during thermal vacuum testing, for example, to simulate the zero pressure conditions of space. The docking station may replace a complex and custom cable feed into the vacuum chamber with a simple universal serial bus (USB) and power feed-through, greatly simplifying testing.

Figure 7A:
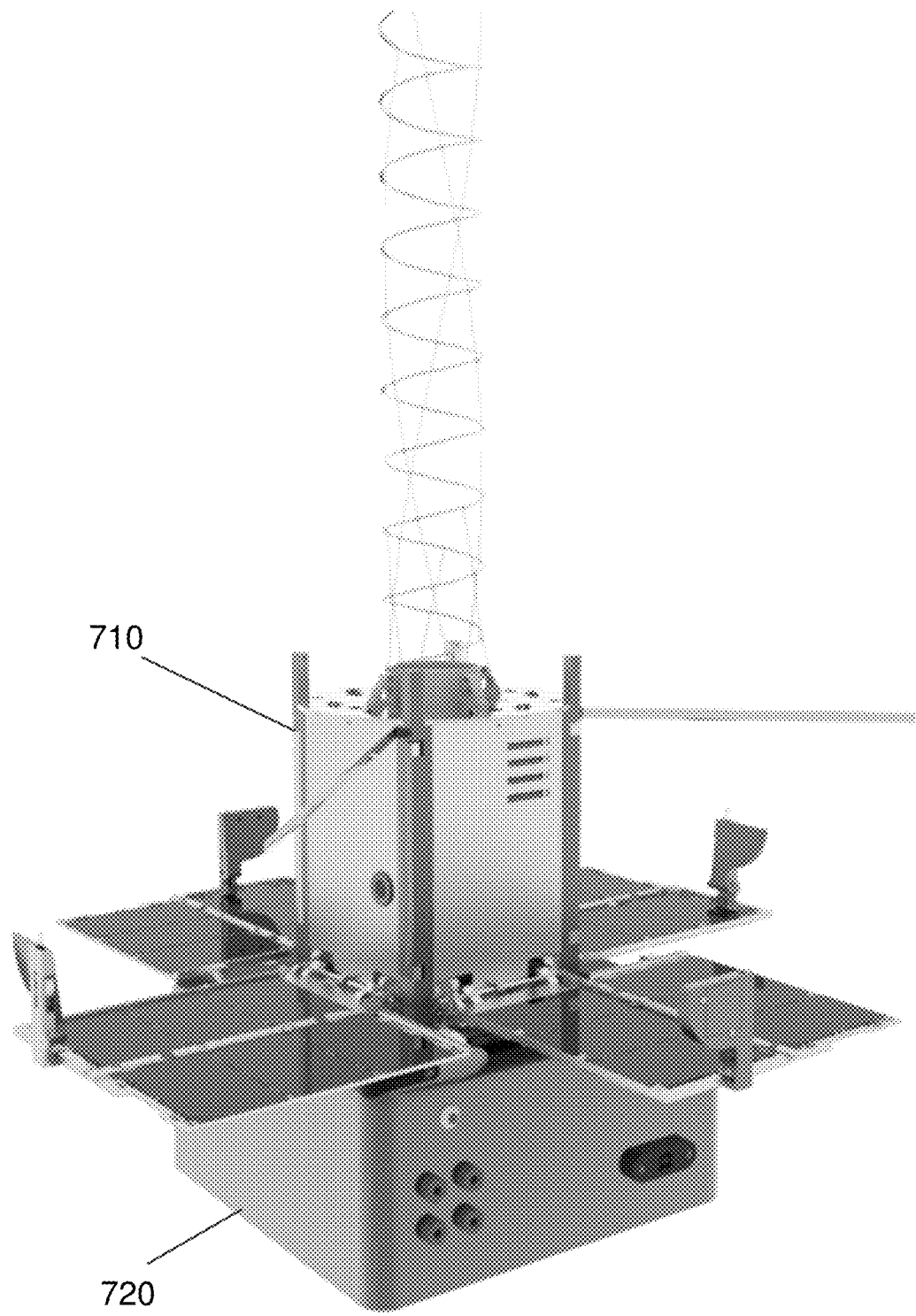
FIG. 7A is a perspective view of a solid model rendering illustrating a docked combination of a space vehicle docked with a docking station, according to an embodiment of the present invention.

FIG. 7A is a perspective view of a solid model rendering illustrating a docked combination 700 of a space vehicle 710 docked with a docking station 720, according to an embodiment of the present invention. Space vehicle 710 may be docked to docking station 720 in either a stowed configuration (not shown) or deployed (as shown) configuration. Space vehicle 710 plugs into docking station 720 via a payload electrical interface board. Docking station 720 then provides power and communications to space vehicle 710 for testing and development. Docking station 720 may be designed to be usable in thermal vacuum testing as well as benchtop testing.

FIG. 7B is a perspective view of a solid model rendering illustrating a top and rear of docking station 720, according to an embodiment of the present invention. A power connector 722 provides power to docking station 720 via either AC power (e.g., from a wall outlet) or DC power (e.g., from a benchtop source). A switch 724 turns power to docking station 720 on and off. Current and voltage monitors 726 provide the ability to monitor space vehicle power consumption.

An "interposer board" 730 is located on the top of docking station 720. Interposer board 730 contains connectors for the space vehicle. In some embodiments, interposer board may have connectors for each solar panel, a remove before flight connector, and a payload interface connector. These connectors may allow all aspects of the space vehicle to be tested from a single unit, including solar panels, the power system, running on internal battery power, etc. Docking station 720 may also be used to charge the satellite batteries, e.g., before integration into a rocket, in some embodiments.

FIG. 7C is a perspective view of a solid model rendering illustrating a top and front of docking station 720, according to an embodiment of the present invention. A USB connection 740 for serial communications with the space vehicle is included that uses a USB-to-serial converter. Current and voltage monitors 742 monitor the satellite power consumption, providing additional diagnostics for test and characterization. An indicator light 744 indicates when the docking station is powered on, and hence, whether the space vehicle is powered on or running on batteries.

Figure 8A:
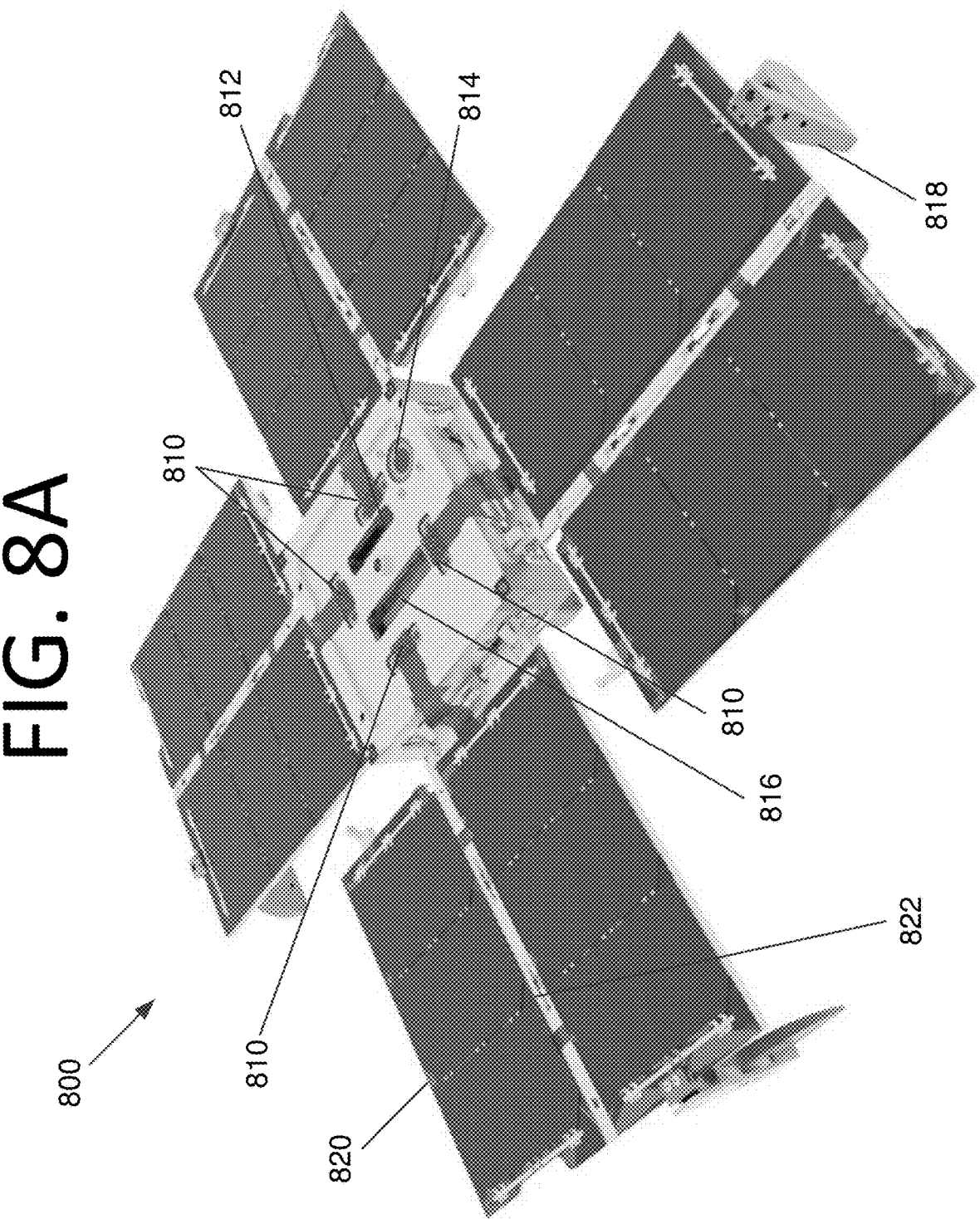
FIG. 8A is a bottom perspective view of a solid model rendering illustrating a power section, according to an embodiment of the present invention.

FIG. 8A is a bottom perspective view of a solid model rendering illustrating a power section 800 and FIG. 8B is a bottom closeup view of a solid model rendering illustrating power section 800, according to an embodiment of the present invention. Power section 800 includes solar panel connectors 810 for attaching solar panels, a safe arm connector 812, a sun sensor 814, and a diagnostic/test connector 816. Power section 800 also includes four bi-fold solar panels 820 including a hinge mechanism 822 allowing bi-fold solar panels 820 to fully open. A magnetometer 818 is attached to each bi-fold solar panel 820, and a flex-circuit 826 connects each bi-fold solar panel 820 to a respective solar panel connector 810. Connectors 810, 812, 816 are connected to the power board (not visible).

Figure 8C:
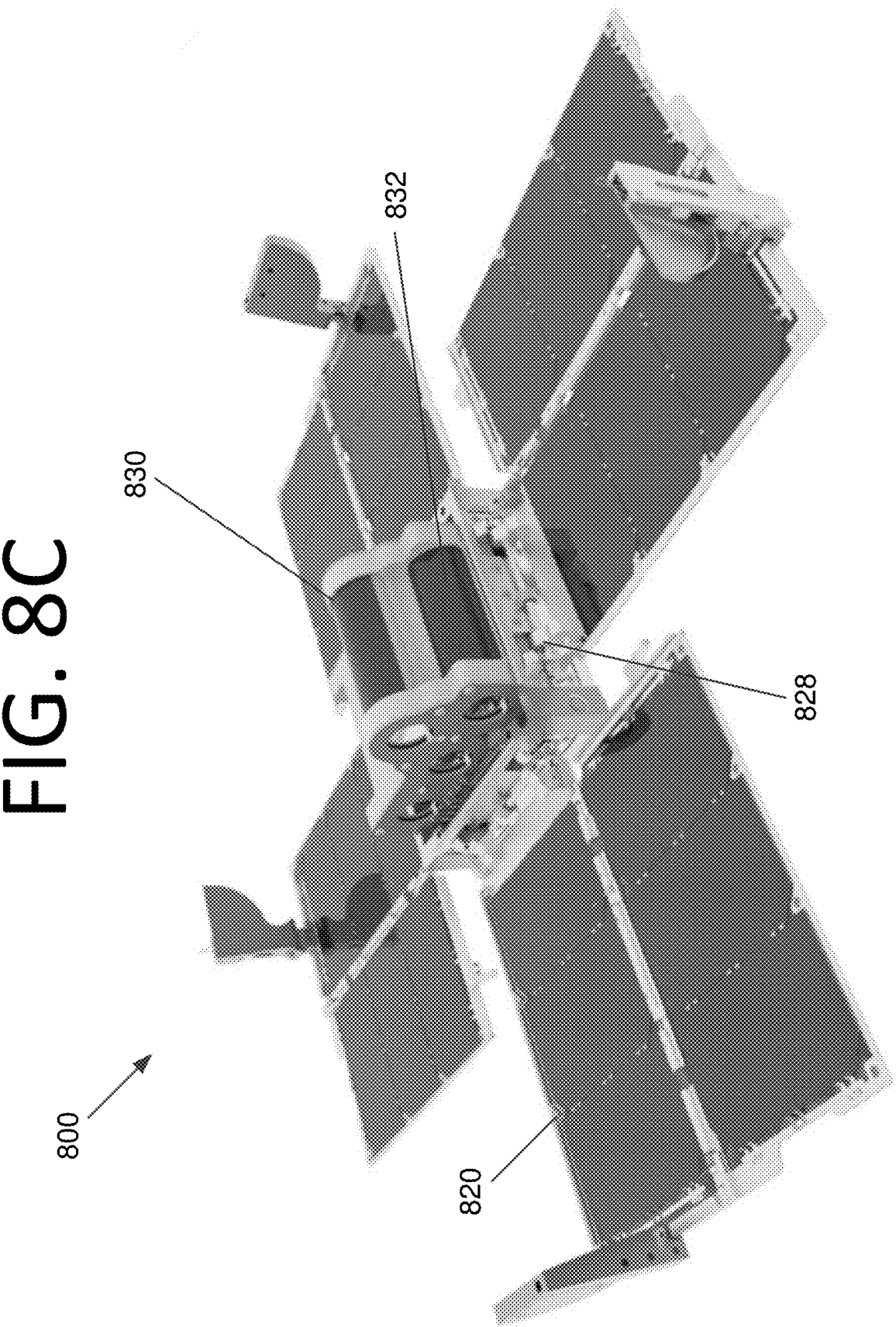
FIG. 8C is a top perspective view of a solid model rendering illustrating the power section, according to an embodiment of the present invention.

FIG. 8C is a top perspective view of a solid model rendering illustrating power section 800, according to an embodiment of the present invention. Power section 800 includes a locking hinge 828 for each bi-fold solar panel 820 that allows each panel 820 to fold down into a horizontal position. Power section also includes batteries 830 covered by thin film heaters 832.

A docking station can interface just to a diagnostic/test connector 816 in some embodiments, but for general development, by removing the mechanical interface plate (not shown), the docking station can interface to all of the connectors at the bottom of the space vehicle. This enables testing of power system 800, simulating bi-fold solar panels 820, etc. While the docking station has the ability to interface with any/all of these connectors in some embodiments, in general, it may have only a single connector to interface to a diagnostic/test connector 816.

Figure 9:
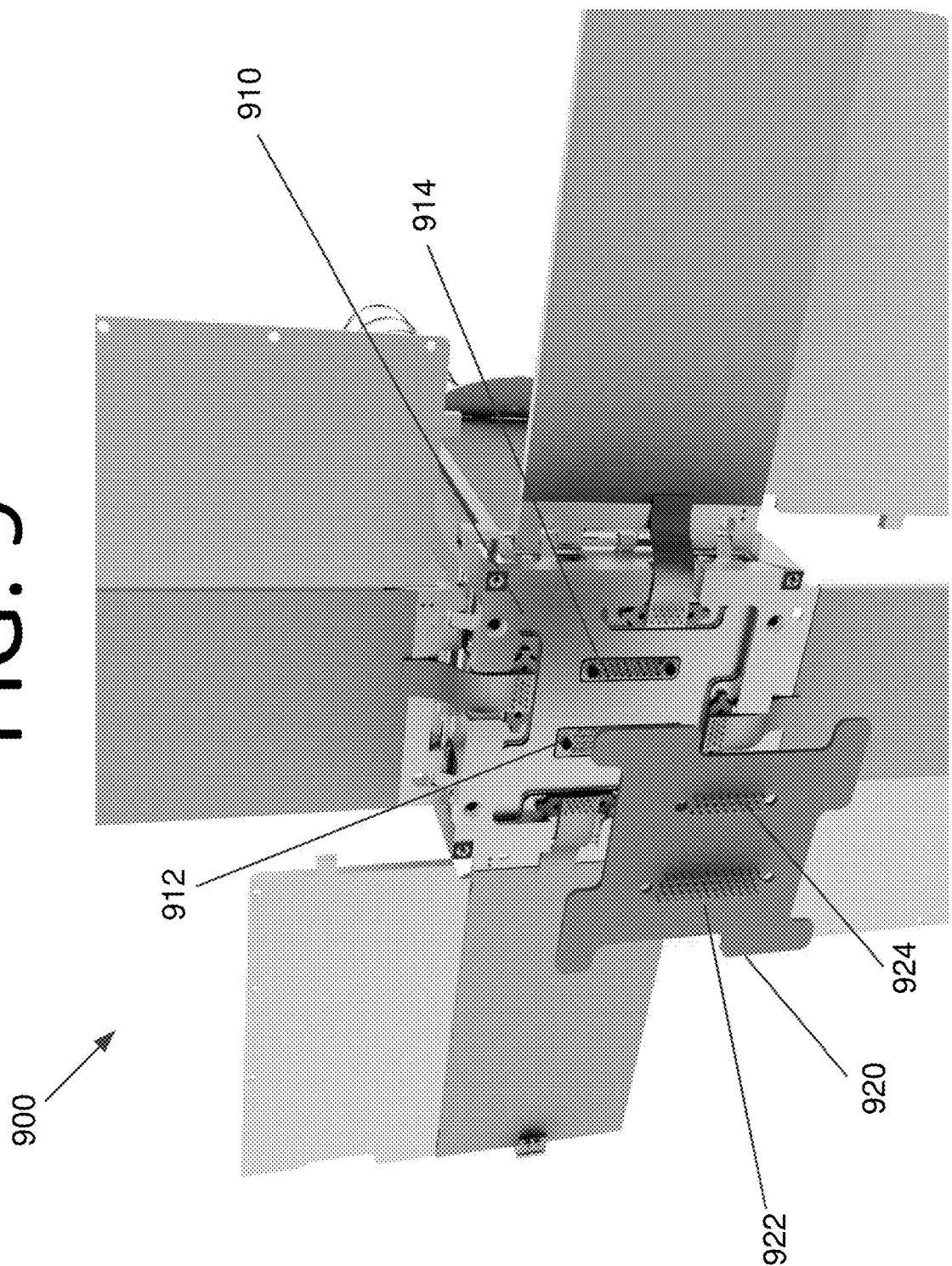
FIG. 9 is an exploded perspective view of a solid model rendering illustrating a power section of a space vehicle with a detached payload electrical interface board, according to an embodiment of the present invention.

FIG. 9 is an exploded perspective view of a solid model rendering illustrating a power section 910 of a space vehicle 900 with a detached payload electrical interface board 920, according to an embodiment of the present invention. In this embodiment, power section 910 has the same connectors as power section 800 of FIGS. 8A-C. For instance, a diagnostic/test connector 912 and safe arm connector 914 are both provided. These attach to respective diagnostic/test connector 922 and safe arm connector 924 of payload electrical interface board 920, allowing communication through payload electrical interface board 920 to these components.

In some embodiments, a space vehicle system includes three pieces: the space vehicle, an interposer or electrical interface board, and a payload. The space vehicle may contain a power board having various connectors, such as those described above. The interposer board may interface the payload to the power board connectors. The interposer board may break out the power and communications, and may provide a processor and global positioning system (GPS) or other functionality for use by the payload section.

In some embodiments, the interposer board may mimic other space vehicle standards, i.e., provide an appropriate interface for payloads that were developed for some other space vehicle standard. Another advantage of this board in some embodiments is that it lets the space vehicle turn the payload on and off. Thus, the space vehicle can prevent the payload from draining the batteries, for example. The idea of some embodiments is to isolate the payload section so that it can't damage or disable the space vehicle. Yet another feature of some embodiments is the ability to have third party developers develop alternative interface/interposer boards. From this viewpoint, the docking station is somewhat analogous to a payload, and board 730 of FIG. 7B, for example, is now the interposer board. It may interface to all of the connectors on the space vehicle power board, just the payload connector, the payload and flight safe/arm connector, etc.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:
1. A system, comprising:
a docking station; and
a space vehicle operably connected to and external to the docking station, wherein
the docking station comprises an interposer board comprising connectors for the space vehicle, the connectors are configured to facilitate testing of the space vehicle via the docking station prior to deployment, and
the docking station is configured to test the space vehicle prior to launch without disassembly of the space vehicle.

2. The system of claim 1, wherein the docking station further comprises current and voltage monitors configured to monitor power consumption of the space vehicle.

3. The system of claim 1, wherein
the space vehicle further comprises at least one solar panel and a power system, and
the connectors of the interposer board are configured to facilitate testing of the at least one solar panel and the power system of the space vehicle.

4. The system of claim 1, wherein
the space vehicle further comprises a plurality of solar panels, and
the connectors of the interposer board further comprise connectors for each of a plurality of solar panels of the space vehicle.

5. The system of claim 1, wherein the connectors of the interposer board further comprise a remove before flight connector.

6. The system of claim 1, wherein the connectors of the interposer board further comprise a payload interface connector configured to facilitate interfacing with a payload of the space vehicle.

7. The system of claim 1, wherein the docking station further comprises a universal serial bus (USB) connector configured to use a USB-to-serial converter for serial communications with the space vehicle.

8. The system of claim 1, wherein the docking station further comprises an indicator light that indicates whether the space vehicle is powered on or running on batteries.

9. The system of claim 1, wherein the docking station further comprises:
a power connector configured to provide alternating current (AC) or direct current (DC) power to the docking station.

10. The system of claim 1, wherein
the space vehicle further comprises a diagnostic/test connector, a power system, and at least one solar connector, and
the docking station is configured to interface with the diagnostic/test connector of the space vehicle, enabling testing of the power system and the at least one solar panel.

11. The system of claim 1, wherein the space vehicle further comprises:
a payload section that houses a payload;
an electrical interface board configured to interface with the payload of the payload section; and
a digital interface board configured to provide dedicated digital processing for the payload, wherein
the electrical interface board comprises a power and communications interface to a main bus of the space vehicle, and
the digital interface board inherits a full software stack of the space vehicle, the software stack comprising a file system, communications, networking, file transfer capabilities, and an ability to be reprogrammed from a ground station.

12. The system of claim 1, wherein
the space vehicle comprises one or more batteries, and
the docking station is configured to charge the one or more batteries of the space vehicle prior to deployment.

13. The system of claim 1, wherein the docking station is configured to provide power and communications to the space vehicle, provide a safe location for space vehicle storage, and provide battery charging for the space vehicle, facilitating a fieldable capability for space vehicle testing.

14. A docking station, comprising:
an interposer board comprising connectors for a space vehicle, the connectors configured to facilitate testing of the space vehicle via the docking station prior to deployment without disassembly of the space vehicle, wherein
the docking station is operably connected to and external to the space vehicle during testing, and
the space vehicle sits upon a top of the docking station when operably connected thereto.

15. The docking station of claim 14, further comprising:
current and voltage monitors configured to monitor power consumption of the space vehicle.

16. The docking station of claim 14, wherein the connectors of the interposer board comprise connectors for each of a plurality of solar panels of the space vehicle, a remove before flight connector, a payload interface connector configured to facilitate interfacing with a payload of the space vehicle, or any combination thereof.

17. The docking station of claim 14, wherein the docking station is configured to interface with a diagnostic/test connector of the space vehicle, enabling testing of a power system and at least one solar panel of the space vehicle.

18. An external docking station for a space vehicle, comprising:
an interposer board comprising connectors for a space vehicle configured to facilitate testing of the space vehicle via the docking station prior to deployment without disassembly of the space vehicle, the connectors comprising connectors for each of a plurality of solar panels of the space vehicle, a remove before flight connector, a payload interface connector configured to facilitate interfacing with a payload of the space vehicle, or any combination thereof;
current and voltage monitors configured to monitor power consumption of the space vehicle;
a universal serial bus (USB) connector configured to use a USB-to-serial converter for serial communications with the space vehicle; and
a power connector configured to provide alternating current (AC) or direct current (DC) power to the space vehicle docking station.

19. The external docking station of claim 18, wherein the docking station is configured to interface with a diagnostic/test connector of the space vehicle, enabling testing of a power system and at least one solar panel of the space vehicle.

20. The external docking station of claim 18, wherein the space vehicle docking station is configured to provide power and communications to the space vehicle, provide a safe location for space vehicle storage, and provide battery charging for the space vehicle, facilitating a fieldable capability for space vehicle testing.

* * * * *